July 31, 1923.

H. W. NICHOLS

VACUUM TUBE APPARATUS

Filed Aug. 2, 1917

1,463,432

Inventor:
Harold W. Nichols
by J. E. Roberts
Atty

Patented July 31, 1923.

1,463,432

UNITED STATES PATENT OFFICE.

HAROLD W. NICHOLS, OF MAPLEWOOD, NEW JERSEY, ASSIGNOR TO WESTERN ELECTRIC COMPANY, INCORPORATED, OF NEW YORK, N. Y., A CORPORATION OF NEW YORK.

VACUUM-TUBE APPARATUS.

Application filed August 2, 1917. Serial No. 184,060.

*To all whom it may concern:*

Be it known that I, HAROLD W. NICHOLS, a citizen of the United States, residing at Maplewood, in the county of Essex and State of New Jersey, have invented certain new and useful Improvements in Vacuum-Tube Apparatus, of which the following is a full, clear, concise, and exact description.

This invention relates to the production of the space current of a vacuum tube employed as an amplifier, a modulator, an oscillator, or for other purposes, by a source of alternating current.

It depends upon the functioning of the tube itself as a rectifier to reduce the alternating current to a pulsating direct current.

The invention comprehends also the connecting together of several tubes in such manner that they may be supplied with alternating current from the same source.

The invention comprehends also novel means of and methods for producing a continuous current of variable amplitude from a multi-phase or other suitable source of alternating current.

The invention comprehends also novel means of and methods for producing a variably rectified current from an alternating source of voltage. For signaling, the rectified current will be varied in accordance with low frequency waves such as telephonic voice currents.

The filaments of the vacuum tube or tubes may likewise be supplied with alternating current when tubes having filaments are employed.

Figure 1:
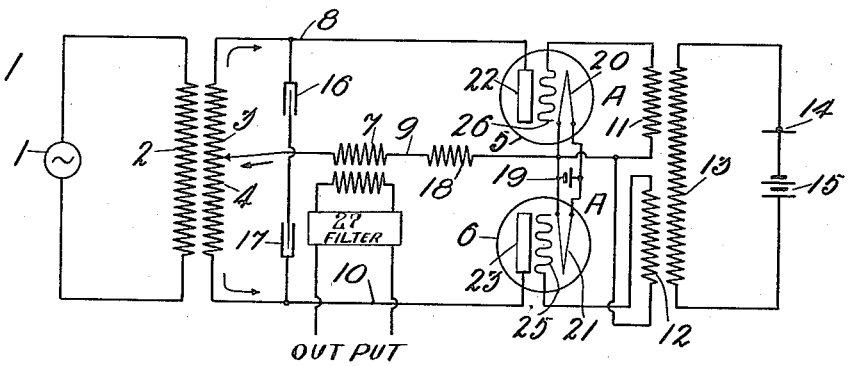
Figure 2:
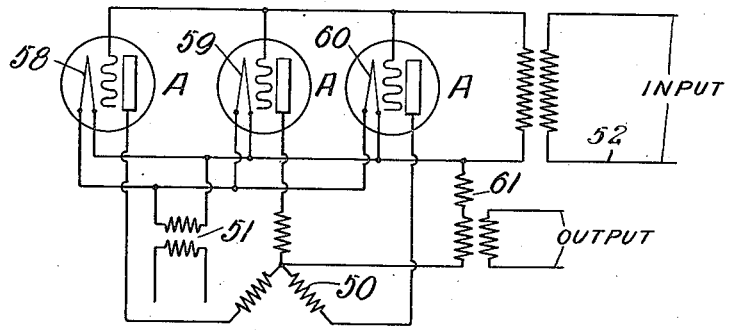
Figure 3:
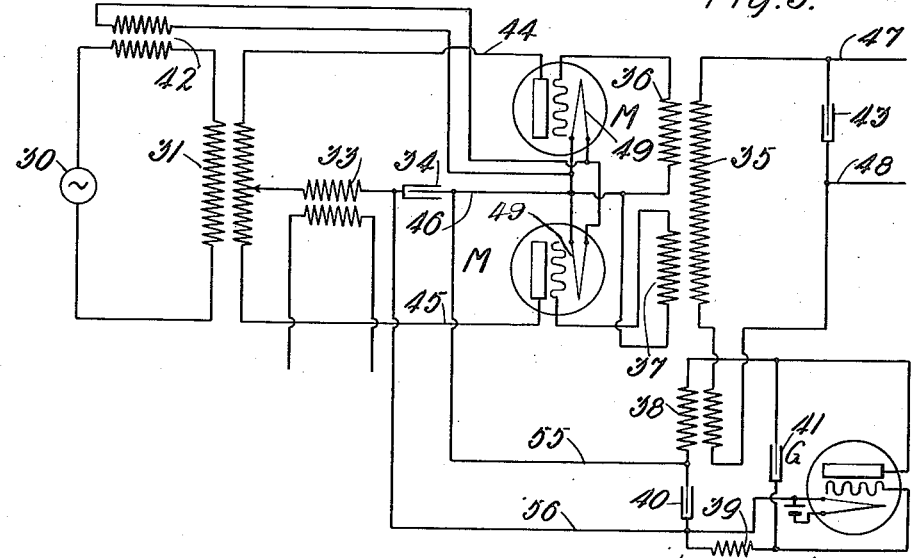

The invention will be better understood by reference to the accompanying drawings, in which Fig. 1 is a diagrammatic view of a system according to this invention, in which alternating current is used to supply an amplifier; Fig. 2 shows an amplifying system in which three-phase alternating current is employed; and Fig. 3 is a diagrammatic view of the system in which vacuum tube modulators are supplied with alternating current.

Referring to Fig. 1, the vacuum tube amplifiers A, A, are supplied with current from the alternating current source 1, through a transformer having a primary coil 2, and a divided secondary coil 3, 4. The secondaries 3, 4 constitute sources of alternating voltage which are 180° apart or in phase opposition with respect to the common line 9. The vacuum tubes A, A, have the property of rectifying as well as amplifying, and advantage is here taken of the former property to permit the use of an alternating current source. Current, therefore, flows in the output circuits 20, 9, 3, 8, 22 and 21, 9, 4, 10, 23, only in the direction of the arrows. The line or consumption circuit is connected to the common portion 9 of these two output circuits through the transformer 7. The current in branch 9 is, therefore, a pulsating direct current.

In order to smooth out the low frequency variations in the branch 9, due to the use of the alternating current, the transformer 2, 3, 4, should have high impedance, and to prevent this high reactance from interfering with the passage of currents of speech frequency in the output circuits, the condensers 16, 17 are bridged across the portions 3, 4 respectively, of the transformer secondary. To more completely eliminate the current variations of the frequency of the generator 1, a wave filter 27 of any suitable type may be placed in the line or consumption circuit. In case a filter is used it will be necessary that the frequencies produced in the line by sources 1 and 14 are sufficiently different to allow their separation by a properly designed filter connected in shunt to or in series with the line.

The input circuits 20, 11, 26 and 21, 12, 25 of the amplifiers A, A, are associated with the microphone circuit 14, 13, 15, through the transformer 11, 12, 13. The portions 11, 12 are oppositely wound, so that the effect of the speech currents upon the grids 25, 26 is always in the same direction. The filaments 20, 21 are heated by current from the battery 19 or any other suitable source, as in Fig. 3 for example.

A resistance 18 may, if desired, be inserted in the branch 9 to improve the quality of transmission.

Fig. 2 shows, by way of example, three amplifiers, A, A, A, the space currents of which are obtained from the three phases respectively of a three-phase source of current. The input circuit 52 represents any source of electrical waves which are to be amplified. The filaments 58, 59, and 60, are shown as supplied with alternating current from an alternating current source 51. Direct current may, of course, be used if desired. Resistance 61 may be inserted to improve the quality of transmission.

Fig. 3 shows an arrangement in which modulators M, M, are supplied with current from the source 30, through transformer 31, in the same manner that the tubes A, A, of Fig. 1, receive current from source 1. The speech transmission circuit 47, 48 is connected to the input circuits of the tubes M, M through a transformer having a primary coil 35, and secondary coils 36, 37. A condenser 43 may, if desired, be bridged across the input circuit 47, 48, as shown in the drawing. High frequency oscillations are produced by the vacuum tube generator G, and its associated circuits, and these oscillations are impressed upon the primary coil 35 of the input transformer, through transformer 38. Inductances 38 and 39 and condenser 40 function in the well-known manner in the generator circuits. Generator G is supplied with space current from the common portion of the output circuits of tubes M, M, condensers 34 and 40, together with lines 55 and 56, serving as a coupling between this common branch and the generator circuit. If desired, however, a separate space current source may be provided for the tube G and connected thereto in a manner well known in the art. The antenna or the output circuit is connected to the branch 46 through transformer 33. The filaments 49 are here shown as supplied with alternating current from the source 30 through transformer 42. As in the prior examples, these filaments may be supplied with current from a direct current source or from an auxiliary alternating current source.

The operation of the systems shown is obvious from the above description. In Fig. 1 the voice currents in circuit 13, 14, 15 induce varying charges upon the grids of the amplifiers A, A, in the well-known manner. As the charges upon these grids vary, corresponding amplified variations are produced in the space currents of the tubes. Transformer 7 eliminates the direct current component of the space current, so that a current similar to that in the microphone circuit but greatly amplified, is produced in the line or consumption circuit. It is well understood, of course, that the purpose of having two vacuum tubes connected as shown rather than a single tube is to make use of both halves of the alternating current wave from source 1, and that it is within the invention to employ a single tube if desired.

The operation of the system of Fig. 2 is similar to that of Fig. 1 except that the three amplifiers A, A, A have their grid-filament circuits connected in parallel with each other and to a common input circuit through a transformer, the filament-plate circuits being connected in parallel with each other and to a common output circuit.

In the system shown in Fig. 3 high frequency oscillations are produced by the generator G. These oscillations along with the speech currents are impressed upon the input circuits of modulators M, M, the space current of the tubes being modulated in the well-known manner. Transformer 33 transforms the modulated direct current to a high frequency alternating modulated current in the antenna or output circuit.

It will be understood that the embodiments of the invention shown and described are by way of example only, and in no way limit the invention, the novel features of which are defined in the claims.

What is claimed is:

1. The combination with a plurality of vacuum tubes, of a common input circuit therefor, an output circuit for each tube, a source of alternating current common to said output circuits for supplying current to the tubes, signaling means associated with said input circuit and an oscillating current generator coupled to said output circuits.

2. The combination with a plurality of vacuum tubes having anodes, grids and filament electrodes respectively, of anode-filament circuits for said tubes, a source of alternating current for supplying current to said anode-filament circuits and for heating said filaments, and means for synchronously varying the potentials of said grids.

3. In combination, an electron discharge device, a source of operating current therefor comprising alternating current of a plurality of phases, an unsymmetrically conducting device for rectifying each phase thereof, and means for changing the impedance of each of said unsymmetrical devices in accordance with signals, said discharge device being located in circuit with each of said unsymmetrically conducting devices and supplied with current from said source.

4. A modulating system comprising a source of a plurality of alternating current voltages not in phase, unsymmetrically conducting space discharge rectifiers therefor, input circuits for said rectifiers, and means for supplying a carrier frequency wave and a signaling frequency wave to said input circuits.

5. A modulating system comprising a source of a plurality of alternating current voltages not in phase, unsymmetrically conducting space discharge rectifiers therefor, an input circuit and a space current circuit for each of said devices, means for synchronously applying to similar circuits of said rectifiers a carrier frequency wave, and means for synchronously applying to similar circuits of said rectifiers a wave according to which said carrier frequency wave is to be modulated.

6. In a signaling system, an electron discharge device, a source of multi-phase alternating current, a rectifying device for each of the phases, a plurality of circuits, each of said circuits being supplied with current of one phase from said multi-phase source and including one of said rectifying devices and said first-named electron discharge device, and means for synchronously varying the impedance of said rectifying devices.

7. In a signaling system, an electron discharge device, a source of multi-phase alternating current and a plurality of unidirectionally conducting electronic discharge rectifying devices, a plurality of circuits, each of said circuits being supplied with current of one phase from said source and including one of said rectifying devices and said first-named electron discharge device, and means for varying the conducting properties of said rectifying devices in accordance with a signal.

8. In combination, a source of multi-phase alternating current, means for rectifying the alternating current, a load circuit, a unidirectionally conducting load device in said load circuit, means for supplying said rectified current to said load circuit, and means controlling said rectifying means for controlling the amplitude of the current supplied to said load circuit.

9. The method which comprises rectifying a plurality of alternating currents not in phase, combining the rectified currents, varying the amplitude of the rectified current in accordance with signals, passing the combined rectified current through a conductive space, and varying the impedance of the space at a high frequency.

10. The method of producing a unidirectional current which varies in amplitude in accordance with signals which comprises variably impeding in accordance with the signals and combining the complete half waves of a plurality of phases of alternating voltage.

11. In combination, a multi-phase source of alternating voltage of frequency low as compared with certain signaling frequencies, rectifying means for each phase thereof, means for changing at said signaling frequencies the conductive properties of the rectifying means for all the phases.

12. In combination, a multi-phase source of alternating voltage of frequency low as compared with speech frequencies, rectifying means therefor, and means for changing in accordance with speech the conductive properties of said rectifying means.

13. In combination, a plural phase source of alternating voltage of relatively low frequency, a rectifier for each phase thereof, and means for synchronously changing the impedance of all of said rectifiers at a relatively high frequency.

14. In combination, a plural phase source of alternating voltage of relatively low frequency, a plurality of vacuum tube repeaters, each having an anode-cathode path in circuit with one of said phases respectively, impedance changing means for said paths, and means acting through said impedance changing means to change the impedance of said paths at relatively high frequencies.

15. In combination, a plural phase source of alternating voltage of relatively low frequency, a vacuum tube repeater for each phase having an anode-cathode path in circuit with said phase, a grid for controlling each path, means for changing the potentials of said grids at relatively high signaling frequencies, and an output circuit having a portion in common with the circuit of each of said phases.

16. In combination, a plural phase source of alternating current, vacuum tube rectifiers therefor, an anode, a cathode, and a space impedance controlling element for each of said rectifiers, a source of alternating current of frequency other than the frequency of said first mentioned source coupled to the circuits of all of said tubes, and means including said impedance controlling elements to vary the internal impedance of each of said tubes in accordance with a signal.

17. The method which comprises separately and variably rectifying a plurality of alternating currents not in phase, combining the variable amplitude rectified currents, transmitting a current varying in accordance with the amplitude variation and controlling the generation of high frequency oscillations by the rectified current.

18. A plurality of electron discharge devices having input and output circuits, three sources of electrical wave energy of different frequency, means for impressing energy from one of said sources on said devices in out-of-phase relation, and means for impressing energy from the other two sources on said devices in in-phase relation.

19. A set of electron discharge devices having input circuits and anode-cathode circuits and having their anode-cathode circuits in parallel relation with respect to a common circuit portion, an alternating power source, a carrier source, and a modulating source of waves, all of said sources being coupled to the circuits of said devices.

20. A circuit comprising an alternating current source, a rectifier therefor, a wave generator controlled by the current rectified by said rectifier, and means for impressing the generated waves on said rectifier.

21. The combination of a space discharge device having appropriate circuits connected thereto whereby said device functions as an oscillation generator, a modulator space discharge device for modulating said oscillations having an input circuit and an output circuit, and a source of alternating current common to said devices for supplying current thereto, said modulator input circuit being coupled to a circuit of said oscillation generator to be supplied with oscillations thereby.

In witness whereof, I hereunto subscribe my name this 1st day of August A. D., 1917.

HAROLD W. NICHOLS.